United States Patent
Rokos

[11] 3,781,081
[45] Dec. 25, 1973

[54] ELECTRO-OPTICAL WAVEGUIDE ARRANGEMENTS

[75] Inventor: George H. S. Rokos, Twyford, England

[73] Assignee: Plessey Handel Und Investments A.G., Zug, Switzerland

[22] Filed: Apr. 17, 1972

[21] Appl. No.: 244,619

[30] Foreign Application Priority Data
Apr. 17, 1971 Great Britain.................... 9,757/71

[52] U.S. Cl......... 350/96 WG, 350/150, 350/160 R
[51] Int. Cl............................ G02b 5/14, G02f 1/26
[58] Field of Search...................... 350/96 WG, 150

[56] References Cited
UNITED STATES PATENTS
3,458,247  7/1969  Buhrer et al...................... 350/150
3,485,553  12/1969  Lee.............................. 350/150 X
3,589,794  6/1971  Marcatili...................... 350/96 WG
3,695,745  10/1972  Furukawa...................... 350/96 WG

*Primary Examiner*—John K. Corbin
*Attorney*—Mason, Mason & Albright

[57] ABSTRACT

An optical switching element is described which has at least two optical paths. The paths are formed by blocks of electro-optical material which, when subjected to an electrical field, suffers a change in refractive index. The material is sensitive to the polarity of the electric field and, by appropriately orientating the material forming the two paths, a common electric field applied across both paths will produce a change in refractive index in opposite senses in the two paths. This enables light transfer between the two paths to be controlled. Also described are logic elements formed by coupling two or more such switching elements.

9 Claims, 7 Drawing Figures

PATENTED DEC 25 1973 3,781,081

ELECTRO-OPTICAL WAVEGUIDE ARRANGEMENTS

This invention relates to electromagnetic wave control arrangements, such as incorporating electro-optical material for example.

The invention provides an electromagnetic wave control arrangement, comprising a first member and a second member which have a common interface, the first and second members being of a material having an ordered structure and being so orientated relative to one another as to cause the speeds of two electromagnetic waves respectively passing through the first and second members to vary in opposite senses in response to a change in value of a common electric field applied to the first and second members.

The invention further provides an electro-optical arrangement, comprising first and second members of an electro-optical ordered structure material whose refractive index varies in dependence upon the value of an applied electric field, said members being joined together to form a common interface, electrodes for applying a common electric field to the arrangement at least over the common interface, the first and second members being so orientated with respect to one another that when subjected to a change in applied electric field the refractive indices of the members to a beam of light having a predetermined polarisation are varied in opposite senses.

The invention still further provides an optical network, comprising a substrate of electro-optical ordered structure material whose refractive index varies in dependence upon the value and polarity of an applied electric field, the substrate having first and second channels therein, which have respective intermediate portions which lie closely alongside each other, first and second electro-optical members filling the channels to form light guiding paths through the channels, the first and second members being so orientated with respect to the substrate that when the members and the portion of the substrate separating the members are subjected to a common electrical field the said portion of the substrate on the one hand and the two members on the other hand suffer a change in refractive index in opposite senses for a polarised light beam, and electrodes for applying the said common electric field to the members and the said portion of the substrate whereby to control the transfer of a polarised light beam between the members in dependence upon the magnitude of said common electric field.

Electro-optical arrangements embodying the invention, will now be described, by way of example, with reference to the accompanying diagrammatic drawings in which.

Figure 1:
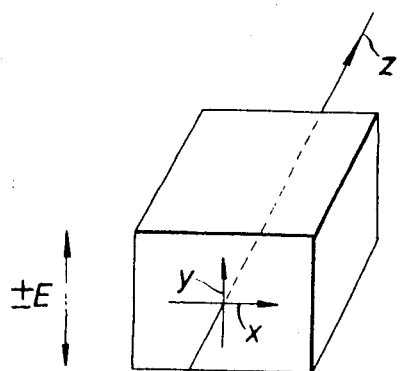
FIG. 1 is a perspective view of a block of electro-optical material.

FIG. 1 shows a crystal of electro-optical material having mutually perpendicular fast and slow axes $x$ and $y$ which extend normal to the direction ($Z$) of propagation of light through the crystal. In FIG. 1 it will be assumed that the fast axis $y$ is in the vertical direction and the slow axis $x$ is in the horizontal direction. Thus when a vertically polarised light beam is passing through the material in the direction $Z$ its velocity will be greater than a horizontally polarised light beam passing through the material.

When an electrical field is applied across the electro-optical material in the direction of its fast axis, with polarity indicated by the arrowhead on the $y$ axis, the speed of a vertically polarised light beam passing through the crystal will be increased. Conversely, when an electric field of the oposite polarity is applied across the material in the direction of the fast axis, the speed of a vertically polarised light beam passing through the crystal will be decreased. Each of these two electric fields will have the opposite effect on a beam of horizontally polarised light passing through the material.

Figure 2:
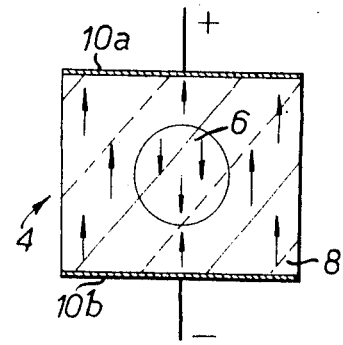
FIG. 2 is a cross-sectional view of one of the electro-optical arrangements embodying the invention.

FIG. 2 shows a crystal 4 of electro-optical material such as, for example, potassium artiydrogen phosphate, in which the central cylindrical portion 6 has been rotated through an angle of 180° with respect to the remainder 8 of the crystal. Two electrodes 10a and 10b are applied on opposite sides of the material.

Since the cylindrical portion of the material is orientated through 180° with respect to the remainder of the block, the fast axis in both the cylindrical portion and the remainder of the crystal still lie in the same plane. Thus vertically polarised light will travel at the same speed through the cylindrical portion and the remainder of the crystal in the absence of an electric field.

However, when an electric field is applied across the electrodes so as to make electrode 10a positive and 10b negative the speed of a vertically polarised light beam passing through the cylindrical portion 6 will decrease while the speed of the same beam passing through the remainder 8 of the crystal will increase. Thus a change in the refractive index of the material will occur at the interface between the cylindrical portion 6 and the remainder 8 of the crystal and will be sufficient to cause internal reflection of the light striking the interface from within the cylindrical portion.

This change in refractive index will be reversed when an electric field of the opposite polarity is applied across the electrodes.

Thus, by the application of an electric field of the appropriate polarity to the electrodes 10a and 10b a beam of light entering the cylindrical portion 6 of the crystal can either be constrained within the cylindrical portion 6 by reflection at the interface between the cylindrical portion and the remainder of the crystal or dispersed into the remainder of the crystal through the interface.

When both vertically and horizontally polarised light beams are passed simultaneously through the cylindrical portion, a field of one polarity will constrain the vertically polarised light beam and disperse the horizontally polarised light beam while a field of the opposite polarity will constrain the horizontally polarised light beam and disperse the vertically polarised light beam.

Figure 3:
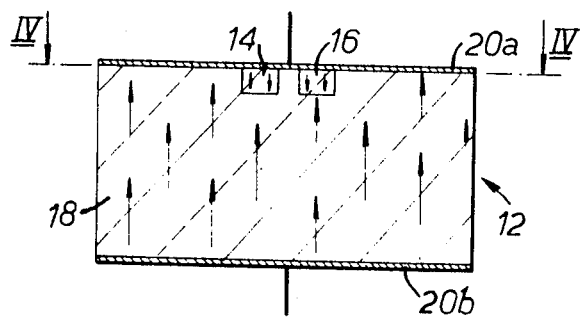
FIG. 3 is a cross-sectional view on the line III—III of FIG. 4 of another electro-optical arrangement embodying the invention.
Figure 4:
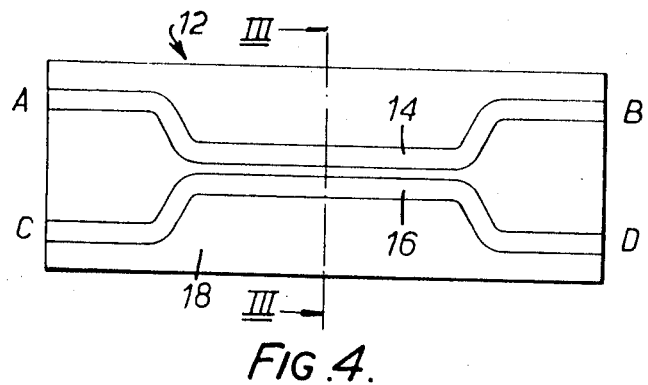
FIG. 4 is a section of FIG. 3 along the line IV—IV.

FIGS. 3 and 4 show a block of electro-optical material 12 in which two elongate bars 14 and 16 have their fast axes rotated through 180° with respect to the fast axis of the remainder 18 of the block.

As can be seen from FIG. 4, the two bars 14 and 16 which can form light guiding channels have central portions of predetermined length which run parallel to each other and lie close together. The opposite ends of the bar 14 respectively terminate inlet/outlet ports A and B while the opposite ends of the bar 16 respectively terminate in inlet/outlet ports C and D.

Two electrodes 20a and 20b lie on opposite sides of the block 12.

In the absence of a voltage across the electrodes 20a and 20b, light passing through the block 12 will not discern any difference between the bars 14 and 16, and the remainder 18 of the block. However, in the presence of an electric field and because of the close proximity of the central portions, an effect occurs which causes light to be readily transferred back and forth between the two bars. The number of transfers of light from one bar to the other per unit length of the bar will depend upon the magnitude of the applied voltage.

Thus, a voltage $V_o$ applied across the electrodes with a particular polarity will cause a polarised beam of light fed into the inlet A to be constrained by the bar at least initially. However, when it reaches the central portion light will start transferring to the bar 16 because of the proximity of the central portion of the bar 16. After most of the light has been transferred to the bar 16 in this way, the light will be transferred back to the bar 14. Once most of the light has returned to the bar 14 it will exit through the port B. The predetermined length of the central portions is such in relation to the wavelength of the light and the magnitude of the voltage $V_o$ that it will not allow light to transfer from the bar 14 to the bar 16 a second time.

However, if a voltage $V_1$ of a greater magnitude but the same polarity is applied to the electrodes 20a and 20b, light entering the port A will only be able to transfer from the bar 14 to the bar 16 and from there exit through the port D.

It will thus be seen that the device shown in FIGS. 3 and 4 constitutes a four terminal optical network, the light path through which is controlled by the application of a voltage to the electrodes 20.

This network is characterised by the following four equations:

$$O_A = I_B (1 - f(v)) + I_D f(v)$$

$$O_B = I_A (1 - f(v)) + I_C f(v)$$

$$O_C = I_B f(v) + I_D (1 - f(v))$$

$$O_D = I_A f(v) + I_C (1 - f(v))$$

where $O_A$, $O_B$, $O_C$ and $O_D$ respectively represent the outputs from the ports A, B, C and D;

$I_A$, $I_B$, $I_C$ and $I_D$ respectively represent the inputs to ports A, B, C or D;

and $f(v)$ is a fraction (between 0 and 1) representative of the transfer of light between bars produced by the applied voltage $V$.

The four terminal network can be arranged to perform the function of a change-over switch.

Thus upon application of the voltage $V_o$ the ports A and B are interconnected and so are the ports C and D.

If now the voltage is changed to $V_1$ the ports A and D are interconnected and so are the ports B and C.

Two four terminal optical networks, each of the four shown in FIGS. 3 and 4, can be interconnected to form logic devices such as AND, NOR, NAND, EXCLUSIVE OR and INCLUSIVE OR and Sheffer Stroke gates for example. The inputs to the devices would be in the form of electrical signals to the electrodes 20a and 20b while the outputs would be in the form of optical signals at the ports B and D. Voltage $V_o$ represents a binary 0 and $V_1$ a binary 1.

Figure 5:
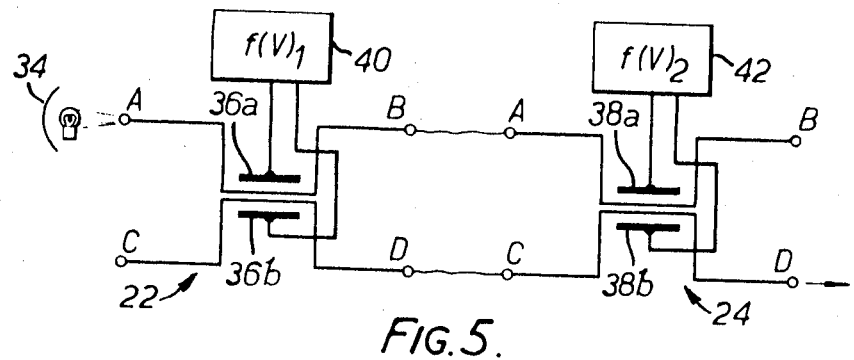
FIG. 5 is a circuit diagram of an Exclusive OR gate incorporating the electro-optical arrangement of FIGS. 3 and 4.
Figure 6:
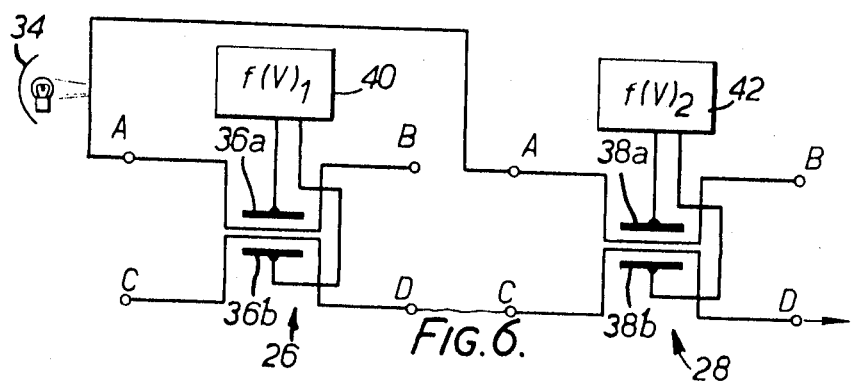
FIG. 6 is a circuit diagram of an Inclusive OR gate incorporating the electro-optical arrangement of FIGS. 3 and 4.

FIGS. 5 and 6 respectively show an EXCLUSIVE OR and an INCLUSIVE OR gate.

The EXCLUSIVE OR gate includes two four terminal optical networks 22 and 24 each constructed in a manner similar to that shown in FIGS. 3 and 4 and each having ports corresponding to the ports in FIG. 4 similarly referenced. The port A of network 22 is connected to a light source 34 and the port D of the network 24 provides the output of the OR gate. Port B of network 22 is connected to port A of network 24 and port D of network 22 is connected to port C. The two inputs of the EXCLUSIVE OR gate comprise the two pairs of electrodes 36a, 36b and 38a, 38b of the two networks, and are fed by a respective one of two signal sources 40 and 42.

The operation of the EXCLUSIVE OR gate will now be described with reference to the following example. Let it be assumed that the two sources 40 and 42 provide a binary 0 at both pairs of electrodes. Then light entering port A of network 22 will exit via port B whereupon it will enter port A of network 24 and exit via port B. No light will pass to port D of network 24 so the output is a binary 0. If now the input to network 24 changes to a binary 1, light entering port A of network 24 will exit via port D and hence provide a binary output of 1. Similarly if the inputs to both networks are binary '1's, light entering port A of network 22 will pass via port D to port C of network 24. Light at port C of network 24 will exit via port B thereby providing a binary 0 at port D of network 24.

Finally the input to network 24 is a binary 0 and the input to network 22 is a binary 1, light from port C of network 24 will pass to port D instead of to port B and thereby provide a binary 1 at port D.

The INCLUSIVE OR gate (FIG. 6) includes two four terminal optical networks 26 and 28 each constructed in a manner similar to that shown in FIGS. 3 and 4 and each having ports corresponding to the ports in FIG. 4 similarly referenced.

Both ports A of the two networks are connected to a common light source (34) while port D of network 26 is connected to port C of network 28. Port D of network 28 constitutes the output of the gate. The two inputs to the gate comprise the two pairs of electrodes 36a, 36b and 38a, 38b of the two networks and are fed by a respective one of two signal services 40 and 42.

The operation of the INCLUSIVE OR gate will be described with reference dependence the following example. Let it be assumed that a binary 0 is present at both pairs of electrodes. Then light from the light source 34 will pass via both ports A to respective ports B. The output from port D of network 28 will therefore be a binary 0. If now the input to the network 26 changes to a binary 1, light from port A of the latter network will now pass to port D and from there to port C of network 28. Light from port C of network 28 will pass to port D and so provide a binary 1. When the inputs to both networks are binary '1's, light from each port A will pass to port D of the respective network, thus providing a binary '1' output at port D of network 28. The light from port D of network 26 will pass via port C of network 28 to port B. If the input to network 26 changes to 0 (the input to network 28 remaining at binary 1) the binary output from port D of network 28 will be unchanged but light from port A of network 26 will pass to port B instead of port D.

Figure 7:
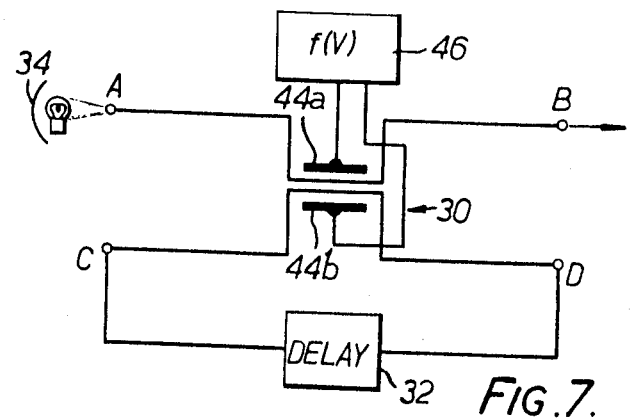
FIG. 7 is a circuit diagram of a switched delay device incorporating the electro-optical arrangement of FIGS. 3 and 4.

FIG. 7 shows a switched delay line incorporating a network 30. The network 30 is similar to that described in conjunction with FIG. 4, has similarly referenced ports a pair of control electrodes 44a and 44b and a signal source 46. The port A forms the optical input of the switched delay line while the port B forms the output. A delay line 32 is connected between ports C and D. In operation when the electrical input to the network from the signal source 46 is a binary 0, light from a source 34 will pass directly from port A to port B. When the electrical input is changed to its other state light will pass from port A to the delay 32 via port D and thence to port B via port C.

It will be appreciated that the network of FIGS. 3 and 4 can also be used to form signal multiplexing and demultiplexing signals, and as analogue modulators and switches for generating Pulse Code Modulation signals.

It will be appreciated that the voltage required to produce a predetermined relative difference in refractive indices is minimised in the arrangements described because the light guide paths and the remainder of the material are so arranged that their refractive indices vary in opposite sense in response to the application of a common electric field.

It will be appreciated that the invention is not limited to the use of optical beams in electro-optical materials but can be applied to other electromagnetic waves used in appropriate materials having an ordered structure and the property of being able to vary the speed of the wave through the material in response to a change in the value of an applied electric signal.

It will be apparent that the arrangements described can be biased by dc electric fields to vary the datum position from which the changes in refractive index take place. Furthermore instead of the optical components of the arrangements described being rotated by 180° with respect to one another, they can be rotated by 90° with respect to one another if the light inputs and outputs to the arrangements are so orientated as to utilise the Pockels effect.

I claim:

1. An electromagnetic wave guiding arrangement comprising
   a first member,
   a second member along which a wave is to be guided mounted in contact with the first member to form a common interface, the interface at least partially defining the path along which the wave is to be guided,
   means for applying a common electric field across the first and second members, and
   a source of electromagnetic waves operable to direct electromagnetic waves to the second member,
   the first and second members being of a material having an ordered structure and being so orientated relative to one another as to cause the refractive indicies of the first and second members to vary in opposite senses in response to a change in value of the common electric field applied to the first and second members so that when the electric field has a first predetermined value a wave entering the second member will be prevented from dispersing from the second member to the first member through the interface and when the electric field has a second predetermined valve the same wave will disperse from the second member through the said common interface into the said first member.

2. An arrangement according to claim 1, wherein electromagnetic wave source comprises an optical light source.

3. An arrangement according to claim 2, wherein the first member comprises an elongate section cut out from a block of the electro-optical material and the second member comprises the remainder of the block, the first member being replaced in the remainder of the block after rotation through an angle of 180°.

4. An optical network, comprising
   a substrate of electro-optical ordered structure material whose refractive index varies in deendence upon the value and polarity of an applied electric field, the substrate having first and second channels therein, which have respective intermediate portions which lie closely alongside each other,
   first and second electro-optical members filling the channels to form light guiding paths through the channels, the first and second members being so orientated with respect to the substrate that when the members and the portion of the substrate separating the members are subjected to a common electrical field the said portion of the substrate on the one hand and the two members on the other hand suffer a change in refractive index in opposite senses for a polarised light beam, and
   first and second electrodes mounted in opposite sides of the substrate for applying the said common electric field to the members and the said portion of the substrate whereby to control the transfer of a polarised light beam between the members in dependence upon the magnitude of said common electric field.

5. A network according to claim 4, wherein the substrate and the members comprise potassium dihydrogen phosphate.

6. A network according to claim 4, wherein the members are of rectangular cross-section.

7. A network according to claim 4, wherein the two ends of each channel-filling member of the network respectively form an input port and an output port so that an electrical field applied to said electrodes can control the transfer function between the ports.

8. An EXCLUSIVE OR logic function circuit comprising
   a first network according to claim 7,
   a second network according to claim 7,
   a light source arranged to direct light at one input part of the first network,
   first means optically connecting one output port of the first network with one input port of the second network, and
   second means optically connecting the other output port of the first network or the other input port of the second network,
   the two electrodes of each network being arranged to form the two inputs of the circuit and one of the output ports of the second network being arranged to form the output of the circuit.

9. An INCLUSIVE OR logic function circuit comprising
a first network according to claim 7,
a second network according to claim 7,
a light source arranged to direct light at one input port of the first network and at one input port of the second network, and
means optically connecting one output port of the first network with the other input port of the second network,
the two electrodes of each network being arranged to form the two inputs of the circuit and one of the output ports of the second network being arranged to form the output of the circuit.

* * * * *